(12) United States Patent
Koeppe et al.

(10) Patent No.: US 11,072,370 B2
(45) Date of Patent: Jul. 27, 2021

(54) UNDERBODY STRUCTURE FOR A MOTOR VEHICLE

(71) Applicant: Dr. Ing. h.c. F. Porsche Aktiengesellschaft, Stuttgart (DE)

(72) Inventors: Alexander Koeppe, Erkrath (DE); Oliver Fischer, Korntal (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 112 days.

(21) Appl. No.: 16/528,799

(22) Filed: Aug. 1, 2019

(65) Prior Publication Data

US 2020/0055547 A1 Feb. 20, 2020

(30) Foreign Application Priority Data

Aug. 15, 2018 (DE) ...................... 10 2018 119 825.6

(51) Int. Cl.
| | | |
|---|---|---|
| *B62D 21/15* | (2006.01) | |
| *B62D 21/10* | (2006.01) | |
| *B62D 35/02* | (2006.01) | |
| *B62D 25/20* | (2006.01) | |

(52) U.S. Cl.
CPC ............. *B62D 21/15* (2013.01); *B62D 21/10* (2013.01); *B62D 25/20* (2013.01); *B62D 35/02* (2013.01)

(58) Field of Classification Search
CPC ...... B62D 21/155; B62D 21/10; B62D 35/02; B62D 37/02
USPC ................................ 296/180.1, 180.5, 181.5
See application file for complete search history.

(56) References Cited

U.S. PATENT DOCUMENTS

| | | | | |
|---|---|---|---|---|
| 4,159,140 A | * | 6/1979 | Chabot ................ | B62D 35/005 |
| | | | | 296/180.5 |
| 9,623,917 B2 | * | 4/2017 | Goldberg ............... | B62D 35/02 |
| 9,975,587 B2 | * | 5/2018 | Aoki ...................... | B62D 35/02 |
| 10,040,493 B2 | * | 8/2018 | Wolf ..................... | B62D 35/007 |
| 10,214,255 B1 | * | 2/2019 | Suzuka ................. | B60R 19/023 |
| 10,933,925 B2 | * | 3/2021 | Palmer .................. | B62D 35/02 |
| 2004/0036320 A1 | * | 2/2004 | Rees ...................... | B62D 37/02 |
| | | | | 296/180.1 |
| 2015/0353148 A1 | | 12/2015 | Wolf | |
| 2019/0009841 A1 | * | 1/2019 | Wolf ....................... | B60R 13/06 |
| 2021/0061373 A1 | * | 3/2021 | Guyon ................... | B62D 37/02 |

FOREIGN PATENT DOCUMENTS

| | | | |
|---|---|---|---|
| DE | 3011652 A1 | 10/1981 | |
| DE | 102011089074 A1 | 6/2013 | |
| DE | 102013105842 A1 | 12/2014 | |
| DE | 102016104934 A1 | 9/2017 | |
| FR | WO2017153662 | * 9/2017 | ............. B62D 35/02 |

(Continued)

*Primary Examiner* — Jason S Morrow
*Assistant Examiner* — Kevin P Weldon
(74) *Attorney, Agent, or Firm* — Leydig, Voit & Mayer, Ltd.

(57) ABSTRACT

An underbody structure for a motor vehicle has: at least one underbody panel; and at least one air guide. The air guide is assigned to the underbody panel and has at least one separation edge for bringing about a flow separation. The air guide is passively pivotable back at least in sections behind a plane formed by a carriageway-side outer side of the underbody panel such that the separation edge is capable of yielding upon contact with an obstacle in order to avoid damage.

13 Claims, 2 Drawing Sheets

(56) References Cited

FOREIGN PATENT DOCUMENTS

| FR | 3059978 | * | 6/2018 |
|----|---------|---|--------|
| JP | 2006327281 A | | 12/2006 |
| JP | 2012214082 A | | 11/2012 |

* cited by examiner

UNDERBODY STRUCTURE FOR A MOTOR VEHICLE

CROSS-REFERENCE TO PRIOR APPLICATION

Priority is claimed to German Patent Application No. DE 10 2018 119 825.6, filed on Aug. 15, 2018, the entire disclosure of which is hereby incorporated by reference herein.

FIELD

The present invention relates to an underbody structure for a motor vehicle.

BACKGROUND

The underbody panel in motor vehicles is conventionally equipped with an aerodynamically effective separation edge. Flow separation is generally achieved by the separation edge, and therefore the aerodynamic behavior of the motor vehicle is improved.

The underbody is generally configured with regard to the boundary surfaces of ground clearance and ramp angle or angle of slope. In order to be aerodynamically effective, the separation edge on the underbody generally has to infringe the boundary surfaces. This may lead to the vehicle hitting the ground, for example in a carpark or on a circuit. Wear of the separation edge occurs in the process. Separation edges are therefore frequently considered to be what are referred to as sacrificial parts of a motor vehicle.

SUMMARY

An underbody structure for a motor vehicle has: at least one underbody panel; and at least one air guide. The air guide is assigned to the underbody panel, and has at least one separation edge for bringing about a flow separation. The air guide is passively pivotable back at least in sections behind a plane formed by a carriageway-side outer side of the underbody panel such that the separation edge is capable of yielding upon contact with an obstacle in order to avoid damage.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
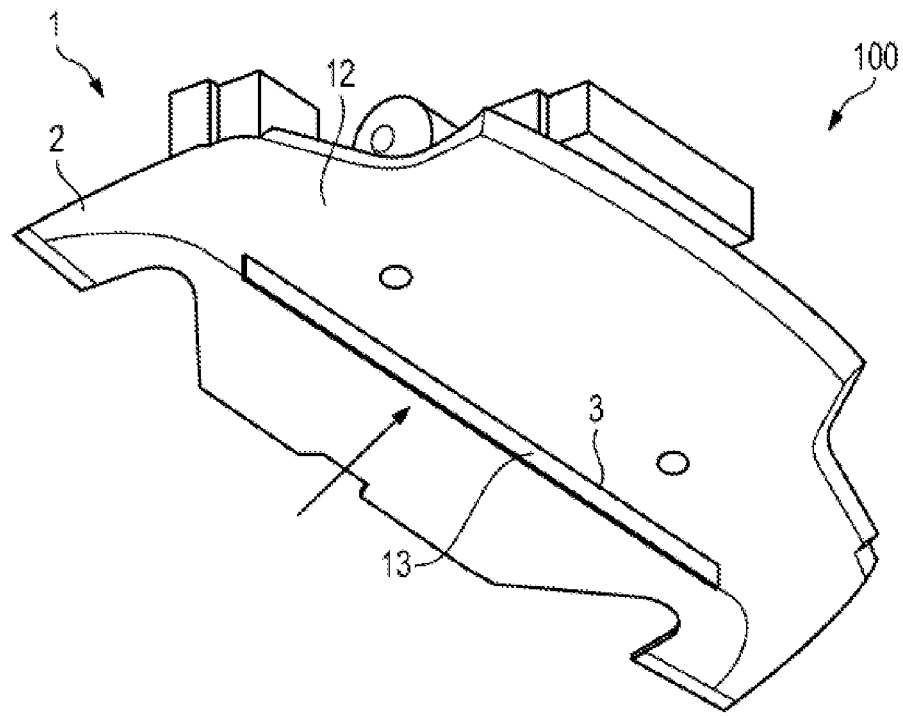
FIG. 1 shows a highly schematized underbody structure according to the invention on a partially shown motor vehicle in a perspective illustration.

Embodiments of the present invention improve the wear behavior of a separation edge of an underbody panel.

The underbody structure according to the present invention is provided for a motor vehicle and preferably for a passenger vehicle. The underbody structure includes at least one underbody panel and at least one air guiding element (or air guide) which is assigned to the underbody panel. The air guiding element includes at least one separation edge for bringing about a flow separation. The air guiding element can be passively pivoted back at least in sections behind a plane formed by a carriageway-side outer side of the underbody panel. As a result, the separation edge can yield upon contact with an obstacle in order to avoid damage or to reduce wear.

The underbody structure according to the invention affords many advantages. One considerable advantage is that the air guiding element can be passively pivoted back and the separation edge thereby undergoes considerably less wear upon contact with the ground. The wear behavior of the separation edge is thus considerably improved. Changing of the separation edge or of the air guiding element can be considerably delayed or even avoided. A motor vehicle equipped with the underbody structure according to the invention can thus be used particularly economically.

In addition, it is particularly advantageous that the air guiding element can be pivoted behind the plane formed by the outer side. The separation edge is particularly well protected there against damage, and therefore the wear can be reduced further.

In particular, the air guiding element can be pivoted back behind the outer side. In particular, the air guiding element can be pivoted at least in sections into a space which is at least partially bounded by the underbody panel. The air guiding element is preferably suitable and designed to at least partially yield in the direction of the vehicle or inward into the underbody panel upon contact with an obstacle.

In particular, the air guiding element can be pivoted back at least by up to half and preferably at least up to two-thirds and particularly preferably at least up to 90% behind the plane. The air guiding element can particularly preferably be completely pivoted back behind the plane. The separation edge can preferably be pivoted back at least in sections and in particular completely behind the plane.

The air guiding element can preferably be pivoted back to such an extent that the separation edge at least partially and preferably completely yields behind the plane formed by the underbody panel. As a result, the separation edge is particularly well protected against damage. In a pivoted-back position, the air guiding element is offset back at least in sections in relation to the plane formed by the outer side.

In all configurations, it is preferred that the air guiding element protrudes on the underbody panel in the direction of the carriageway, in particular if no contact with an obstacle occurs. In particular, the air guiding element is in a basic position if no contact with an obstacle occurs. The basic position is in particular the position provided for the proper operational effectiveness of the separation edge. In particular, the air guiding element is not actively movable out of the basic position. In particular, the air guiding element is not actively pivotable. In particular, the air guiding element is not adjustable. Such a configuration provides a particularly uncomplicated and cost-effective construction. The air guiding element may also be adjustable.

The underbody panel preferably has at least one recess through which the air guiding element passes at least in sections as it pivots back. The separation edge can thus yield into a particularly well protected space. The recess is designed in particular as a passage opening. In particular, the air guiding element retracts upon pivoting back in the direction of a lower side of the vehicle. In particular, the air guiding element in a pivoted-back position can be accommodated at least in sections and in particular completely in the recess.

It is also possible and preferred for the underbody panel to have at least one recess in the form of a depression. In particular, the recess is in the form of a depression on an outer side of the underbody panel or includes at least one such depression. The air guiding element as it pivots back can pivot at least in sections into the depression. This provides an advantageous covering of the region lying above the underbody panel.

The air guiding element is particularly preferably connected to the underbody panel via at least one hinge device. The hinge device is preferably in the form of a film hinge or includes at least one such film hinge. This permits a particularly cost-effective and at the same time reliable construction. A different type of hinge device may also be provided. The air guiding element can be connected to the underbody panel indirectly via the hinge device or directly. In particular, the air guiding element is fastened indirectly or directly to the underbody panel. In particular, the air guiding element is held in the basic position by the hinge device.

The hinge device is preferably at least partially arranged on a vehicle-side inner side of the underbody panel. This provides a particularly protected way of accommodating the hinge device. The inner side is in particular arranged facing away from a carriageway-side outer side or facing the latter. It is also possible for the hinge device to be at least partially arranged on a carriageway-side outer side of the underbody panel. The hinge device can be at least partially arranged in a recess.

In an advantageous configuration, in an intended installation position of the underbody structure, a pivot axis of the hinge device is arranged upstream of the separation edge in the direction of travel. This has the advantage that no undesirable pivoting of the separation edge occurs by means of the aerodynamic forces to be expected in the intended operation of the underbody structure. A different positioning of the pivot axis in which the aerodynamic forces to be expected preferably do not cause any undesirable pivoting of the separation edge is also possible. The arrangement of the pivot axis relates here in particular to a basic position or a non-pivoted position of the air guiding element.

In a further advantageous configuration, in an intended installation position of the underbody structure, a pivot axis of the hinge device is arranged downstream of the separation edge in the direction of travel. The hinge device here preferably has adjustment forces which are higher than the aerodynamic forces to be expected in the intended operation of the underbody structure. An undesirable pivoting in the driving mode can thus be effectively counteracted. In particular, the film hinge is suitable and designed to apply such adjustment forces.

In all configurations, it is preferred that the pivot axis of the hinge device runs transversely with respect to an X axis or transversely with respect to an axis of the direction of travel of the underbody structure. A different positioning of the pivot axis is also possible.

In particular, the hinge device includes at least two hinge arms connected pivotably to one another. In particular, the air guiding element is arranged in an angled manner on one of the two hinge arms. An arrangement of the air guiding element on the hinge arm permits a particularly advantageous pivot radius. As a result, the separation edge can be particularly reliably pivoted out of a contact region with the obstacle. For example, the air guiding element protrudes from the hinge arm transversely and in particular at right angles. The hinge arms are in particular connected to one another via at least one joint.

In particular, the air guiding element is arranged at a distance from the pivot axis of the hinge device. In particular, the separation edge is provided by at least one edge surface which is arranged transversely with respect to a basic surface of the hinge arm. In particular, the air guiding element is arranged on the hinge arm at an angle of 90°+/− 30° and, for example, of 90°. For example, the air guiding element is arranged at an angle of between 70° and 110° and preferably between 80° and 100°. Other suitable angles are also possible.

In particular, the air guiding element is connected to the hinge arm by a side edge which lies opposite the separation edge. In particular, the air guiding element is of wall-like design. In particular, the air guiding element rises from the hinge arm in a wall-like manner. In particular, the air guiding element is provided by at least one wall running transversely with respect to the X axis or an axis of the direction of travel. The air guiding element, in particular the wall, is preferably upright on the hinge arm.

In particular, the air guiding element is fastened to the hinge arm and is preferably fastened immovably. In particular, the air guiding element is pivotable only together with the hinge arm.

In particular, the one hinge arm and the air guiding element protruding thereon together form a T-shaped cross-sectional profile. As a result, in particular at least one supporting section is provided with which the hinge arm can rest on the underbody panel. The air guiding element can thus be held in a basic position in a particularly stable manner. The supporting section can be placed in particular on an inner side of the underbody panel. For the T-shaped cross-sectional profile, a central arrangement or else an eccentric arrangement of the air guiding element on the hinge arm can be provided. It is also possible for the hinge arm and the air guiding element together to form an L-shaped cross-sectional profile or another suitable cross-sectional profile.

A recess arranged in the underbody panel can preferably be at least partially closed by the hinge arm which is equipped with the air guiding element. The aerodynamic properties can thus be considerably improved. The recess here is in particular the previously described recess through which the air guiding element can pass. The recess is closeable in particular in the manner of a cover.

In all configurations, it is particularly preferred for the hinge device to be formed or connected integrally with/to the air guiding element. In all configurations, it is likewise particularly preferred for the hinge device to be formed integrally with the underbody panel. This permits particularly economical production and installation of the corresponding components. In particular, the hinge device is formed integrally. In particular, at least one hinge arm is formed integrally with the air guiding element. In particular, at least one hinge arm is formed integrally with the underbody panel. In particular, the hinge arms are connected integrally to one another. It is also particularly preferred for the separation edge to be formed integrally with the air guiding element.

The hinge device and/or the air guiding element and/or the underbody panel are particularly preferably provided by a common component and preferably plastics component. The component can be designed, for example, as a molded part, cast part or injection-molded part or as a component manufactured by a different method. The hinge device and/or the air guiding element and/or the underbody panel are manufactured in particular from a plastics polymer. Other materials are also possible. The air guiding element is preferably injection-molded on an inner side of the underbody panel and is connected pivotably thereto via a film hinge.

In particular, the hinge device and/or the air guiding element and/or the underbody panel are connected to one another in an integrally bonded manner. In particular, the air guiding element and the hinge device are fastened to in particular an inner side of the underbody panel by injection molding. It is also possible for the hinge device and/or the air guiding element and/or the underbody panel to be designed as separate components or in multiple parts.

The motor vehicle according to the invention is designed in particular as a passenger vehicle and includes at least one underbody structure, as has been previously described.

The motor vehicle according to the invention also affords many advantages and permits particularly economical maintenance since the wear behavior of the separation edge is considerably improved.

The separation edge serves in particular for detaching an air flow from a carriageway-side outer side of the underbody panel. The separation edge runs in particular transversely with respect to an X axis or transversely with respect to an axis of the direction of travel of the underbody structure. In particular, the separation edge runs along a Y axis. Other orientations of the separation edge are also possible.

The underbody panel serves in particular for lining a rear region and/or a front region and/or another suitable region of a motor vehicle. In particular, the underbody panel is designed as a rear underbody panel and/or as a front underbody panel.

Further advantages and features of the present invention emerge from the exemplary embodiment which will be explained below with reference to the attached figures.

FIG. 1 shows an underbody structure 1 according to the invention as can be used, for example, on a motor vehicle 100 according to the invention. Of the motor vehicle 100, only parts of a rear portion are visible here. The motor vehicle 100 is in the form of a passenger vehicle.

The underbody structure 1 includes an underbody panel 2 which serves here as a rear underbody panel. The underbody structure 1 is shown from below, and therefore a carriageway-side outer side 12 of the underbody panel 2 can be particularly readily seen.

The underbody panel 2 is provided here with an air guiding element 3 having a separation edge 13. A flow separation is brought about in the driving mode by the separation edge 13. The flow direction of the separation edge 13 is indicated here by an arrow. The air guiding element 3 protrudes here on the underbody panel 2 in the direction of the carriageway. This corresponds here to a basic position which is provided, for example, during a normal driving mode.

In order to be able to yield upon contact with an obstacle or with the ground, the air guiding element can be pivoted back behind a plane formed by the outer side 12. The air guiding element 3 yields back here inward into the underbody panel 2. Damage and increased wear of the separation edge 13 can thus be avoided. The pivoting out of the basic position takes place passively here, i.e. only by means of the influence of an obstacle.

Figure 2:
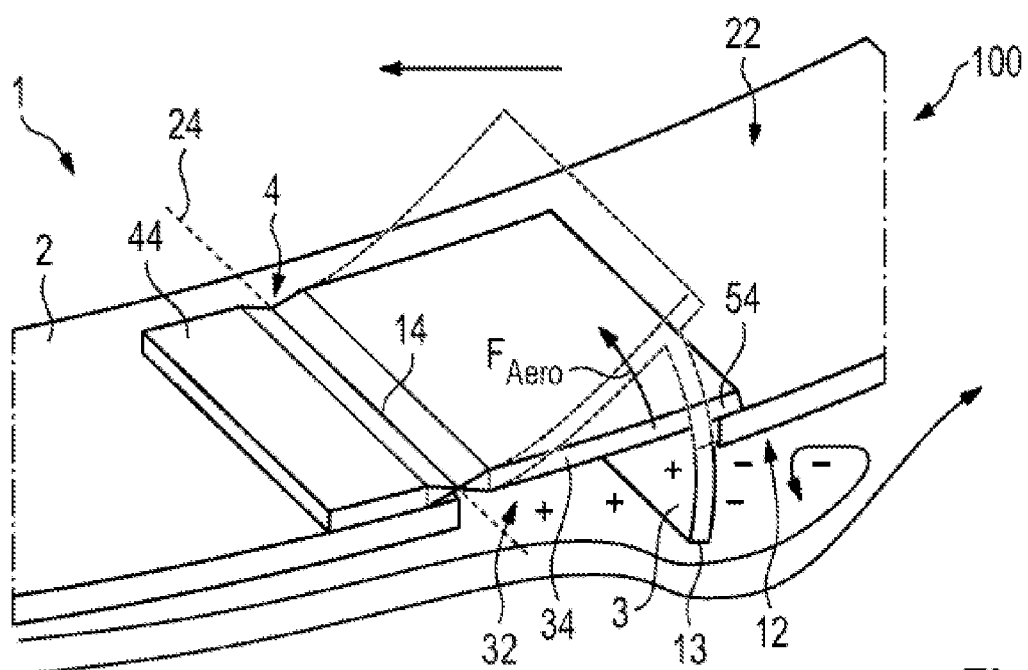
FIG. 2 shows a purely schematic illustration of an underbody structure in a sectioned perspective side view.

FIG. 2 shows a configuration of the underbody structure 1 in which the air guiding element 3 is connected to the underbody panel 2 via a hinge device 4. The hinge device 4 is here in the form of a film hinge 14 and includes two hinge arms 34, 44 connected pivotably to each other.

A pivot axis 24 of the hinge device 4 is indicated here by a dashed line. The air guiding element 3 moves together with the hinge arm 34 about the pivot axis 24.

The hinge device 4 is arranged here on a vehicle-side inner side 22 of the underbody panel 2. The underbody panel 2 is provided with a recess 32 in the form of a passage opening. The air guiding element 3 extends here from the outer side 12 through the recess 32 to the inner side 22.

The air guiding element 3 and the hinge device 4 are shown here in two different positions. In a first position which is shown continuously here, the air guiding element 3 protrudes on the outer side 12 in the direction of the carriageway. This corresponds to the basic position for the driving mode.

In a second position which is shown here by dashed lines, the air guiding element 3 is pivoted. This position is assumed when the separation edge 13 is in contact with the ground. In this position, the air guiding element 3 has been pivoted back here to such an extent that it has passed completely through the recess 32. The separation edge 13 is therefore also located behind the plane formed by the outer side 12. The air guiding element 3 has therefore yielded completely into the interior of the underbody panel 2. The pivoting back into the basic position takes place, for example, by means of a prestressing force of the hinge device 4.

The air guiding element 3 is arranged here in an angled manner on the hinge arm 34. The air guiding element 3 protrudes from the hinge arm 34 in a wall-like manner. The other hinge arm 44 is fastened here, and is, for example, injection molded, on the inner side 12 of the underbody panel 2. The hinge arm 44 can be connected integrally to the underbody panel 2.

The air guiding element 3 and the hinge arm 34 together form a T-shaped cross-sectional profile here. This structure provides a supporting section 54. The hinge arm 34 rests with the supporting structure 54 on the inner side 22 when the air guiding element 3 is in the basic position. The air guiding element 3 is thus stabilized in the basic position. In addition, the recess 32 can thus be particularly readily closed by the hinge arm 34.

The hinge device 4 is formed integrally here with the air guiding element 3. In addition, the separation edge 13 is formed integrally with the air guiding element 3. The hinge device 4 is in the form of an integral film hinge 14 here. For example, the film hinge 14 is manufactured together with the air guiding element 3 from a polymer and is injection-molded onto the underbody panel 2. Other configurations are also possible.

The pivot axis 24 is arranged here behind the separation edge 13 in the direction of travel. The direction of travel is indicated here by a solid arrow. So that an undesirable folding-in because of aerodynamic forces is prevented, the adjustment forces of the hinge device 4 are higher here than the aerodynamic forces to be expected in the intended driving mode. The flow ratios are indicated in highly schematic form by arrows. The pressure ratios are indicated in highly schematic form by + or −. The forces are sketched here by a straight arrow.

Figure 3:
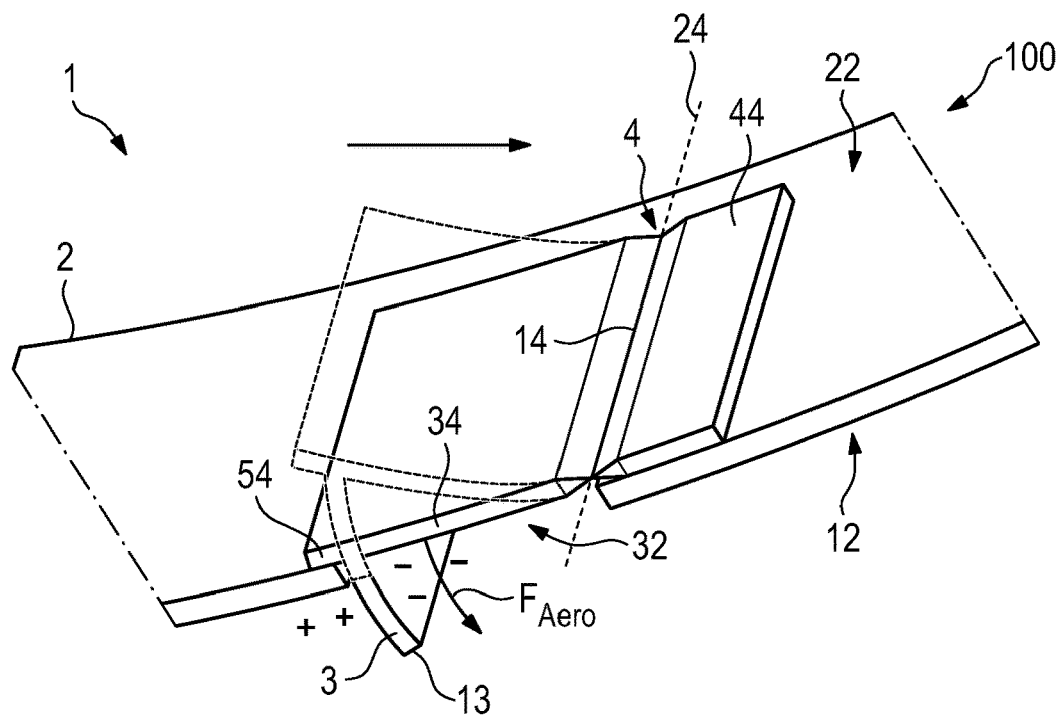
FIG. 3 shows a purely schematic illustration of a further underbody structure in a sectioned perspective side view.

FIG. 3 shows a configuration of the underbody structure 1 in which the pivot axis 24 is arranged here upstream of the separation edge 13 in the direction of travel. This has the advantage that aerodynamic forces do not lead to folding-in of the air guiding element 3. Otherwise, the underbody structure 1 here is designed as described with reference to FIG. 2.

Figure 4:
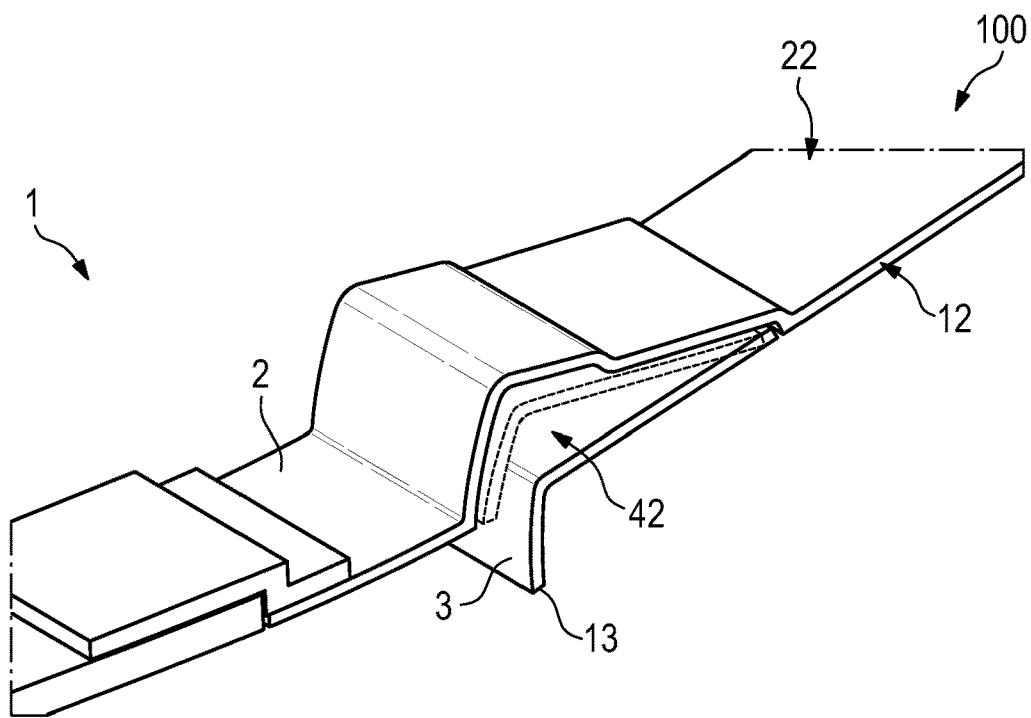
FIG. 4 shows a purely schematic illustration of a further underbody structure in a sectioned perspective side view.

FIG. 4 shows an underbody structure 1 in which the recess 32 is in the form of a depression 42. The recess 32 here is therefore not a passage hole. Upon contact with an obstacle, the air guiding element 3 is pivoted here into the depression 42 to such an extent that the separation edge 13 no longer protrudes beyond the plane formed by the outer side 12. This provides reliable protection for the air guiding element 3 and at the same time effective covering of the region lying above the underbody panel 2 and, for example, of a rear engine. The pivoted-in position of the air guiding element 3 is indicated here by dashed lines.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The following is a list of reference signs used herein:
1 Underbody structure
2 Underbody panel
3 Air guiding element
4 Hinge device
12 Outer side
13 Separation edge
14 Film hinge
22 Inner side
24 Pivot axis
32 Recess
34 Hinge arm
42 Depression
44 Hinge arm
54 Supporting section
100 Motor vehicle

What is claimed is:

1. An underbody structure for a motor vehicle, the underbody structure comprising:
at least one underbody panel;
at least one hinge, the hinge comprising at least two hinge arms connected pivotably to one another and where at least one hinge arm of the hinge is connected to the underbody panel; and
at least one air guide, which is connected to at least one of the hinge arms and is disposed in an angled manner on that hinge arm and has at least one separation edge for bringing about a flow separation,
wherein the air guide is passively pivotable back at least in sections behind a plane formed by a carriageway-side outer side of the underbody panel such that the separation edge is capable of yielding upon contact with an obstacle in order to avoid damage.

2. The underbody structure as claimed in claim 1, wherein the air guide protrudes on the underbody panel in a direction of the carriageway as long as no contact with the obstacle occurs.

3. The underbody structure as claimed in claim 1, wherein the underbody panel has at least one recess through which the air guide is configured to pass at least in sections as the air guide pivots back.

4. The underbody structure as claimed in claim 1, wherein the underbody panel has at least one recess in the form of a depression, and the air guide is configured to pivot at least in sections into the depression as the air guide pivots back.

5. The underbody structure as claimed in claim 1, wherein the at least one hinge is in the form of a film hinge.

6. The underbody structure as claimed in claim 1, wherein the hinge is at least partially arranged on a vehicle-side inner side of the underbody panel.

7. The underbody structure as claimed in claim 1, wherein, in an installation position of the underbody structure, a pivot axis of the hinge is arranged upstream of the separation edge in a direction of travel such that no pivoting of the separation edge occurs due to aerodynamic forces acting in the operation of the underbody structure.

8. The underbody structure as claimed in claim 1, wherein, in an installation position of the underbody structure, a pivot axis of the hinge is arranged downstream of the separation edge in a direction of travel, and wherein the hinge has adjustment forces which are higher than the aerodynamic forces in the operation of the underbody structure.

9. The underbody structure as claimed in claim 1, wherein one of the hinge arms and the air guide protruding thereon together form a T-shaped cross sectional profile such that at least one supporting section is provided with which the one hinge arm can rest on the underbody panel.

10. The underbody structure as claimed in claim 1, wherein a recess arranged in the underbody panel is at least partially closable by the hinge arm of the at least two hinge arms that is equipped with the air guide.

11. The underbody structure as claimed in claim 1, wherein the hinge is formed integrally with the air guide and/or with the underbody panel.

12. A motor vehicle comprising at least one underbody structure as claimed in claim 1.

13. The underbody structure as claimed in claim 3, wherein the air guide element in a pivoted-back position is accommodated completely in the recess.

* * * * *